United States Patent
Yamaguchi

(10) Patent No.: US 8,023,023 B2
(45) Date of Patent: Sep. 20, 2011

(54) IMAGE SENSING APPARATUS INCLUDING CHARGE TRANSFER OPERATION AND CONTROL METHOD THEREFOR

(75) Inventor: Toshiro Yamaguchi, Yokohama (JP)

(73) Assignee: Canon Kabushiki Kaisha (JP)

( * ) Notice: Subject to any disclaimer, the term of this patent is extended or adjusted under 35 U.S.C. 154(b) by 576 days.

(21) Appl. No.: 12/108,097

(22) Filed: Apr. 23, 2008

(65) Prior Publication Data

US 2008/0266423 A1    Oct. 30, 2008

(30) Foreign Application Priority Data

Apr. 24, 2007 (JP) ................ 2007-114370
Aug. 2, 2007 (JP) ................ 2007-201955

(51) Int. Cl.
*H04N 3/14* (2006.01)
*H04N 5/335* (2011.01)
(52) U.S. Cl. .................. 348/304; 348/302
(58) Field of Classification Search .......... 348/220.1, 348/302–304, 312
See application file for complete search history.

(56) References Cited

U.S. PATENT DOCUMENTS

2001/0050713 A1 * 12/2001 Kubo et al. ............ 348/220

FOREIGN PATENT DOCUMENTS

| EP | 0 863 663 A2 | 9/1998 |
| JP | 2006-42261 A | 2/2006 |
| WO | 2007/027590 A2 | 3/2007 |

OTHER PUBLICATIONS

Notification of First Office Action issued in corresponding Chinese Patent Application No. 2008100935507 dated Oct. 16, 2009.

* cited by examiner

*Primary Examiner* — Kelly L Jerabek
(74) *Attorney, Agent, or Firm* — Rossi, Kimms & McDowell LLP

(57) ABSTRACT

An image sensing apparatus capable of reducing degradation of a signal-to-noise ratio property occurring when a driving frequency of an image sensing element is high, depending on a state of an operation mode. An information table is stored in a memory section, which includes information on a timing of a horizontal transfer driving signal for performing charge transfer in the horizontal direction in an image sensing element, information on a timing of a reset gate signal for performing charge sweep per pixel, and information on a timing of a feed-through sample-hold signal for sample-holding a feed-through section of the output signal of the image sensing element which becomes a black reference per pixel, in association with an operation mode of an image sensing apparatus. The information table associated with the set operation mode is selected from the memory section, and the element is driven based on the information table.

2 Claims, 13 Drawing Sheets

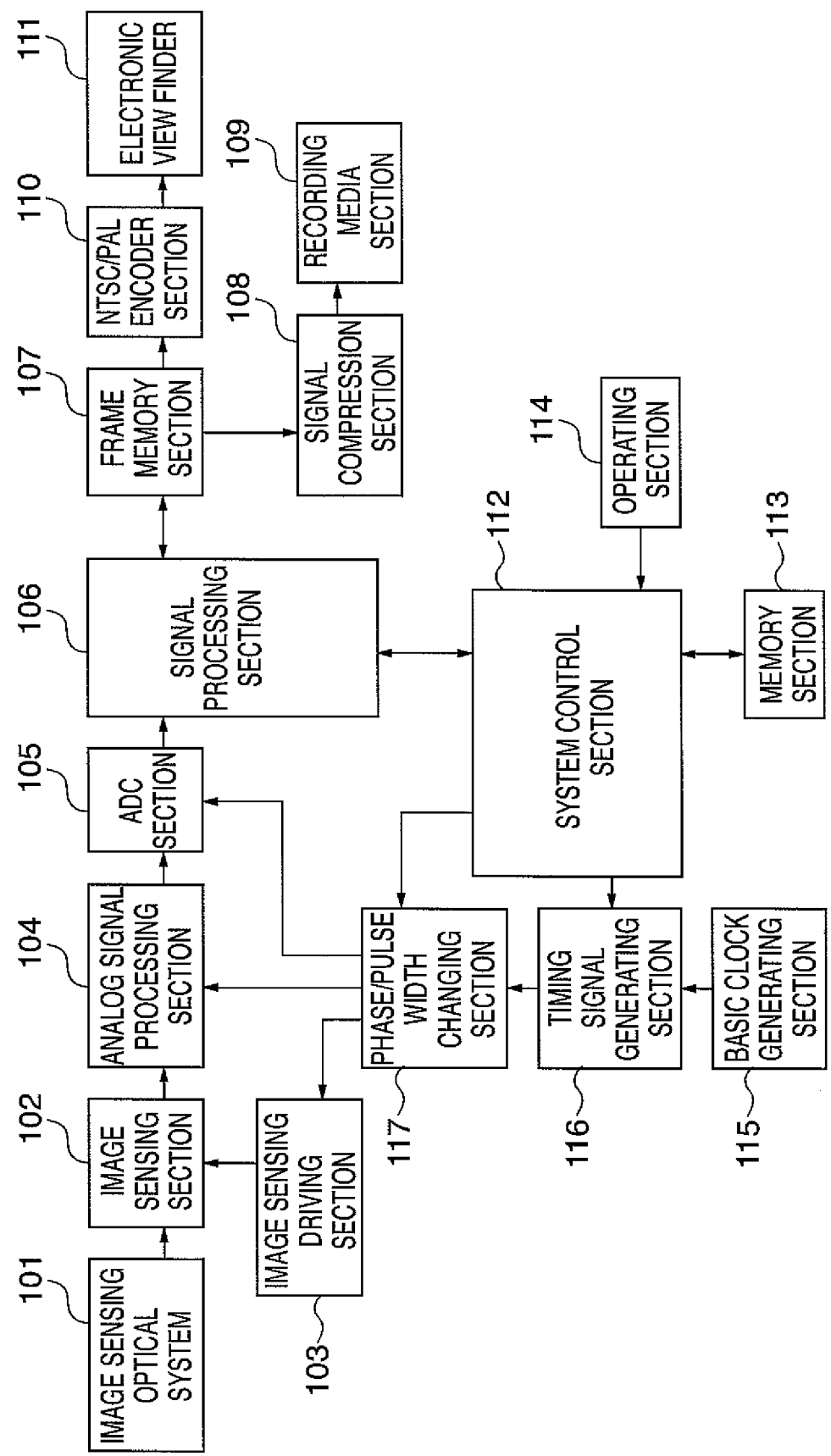

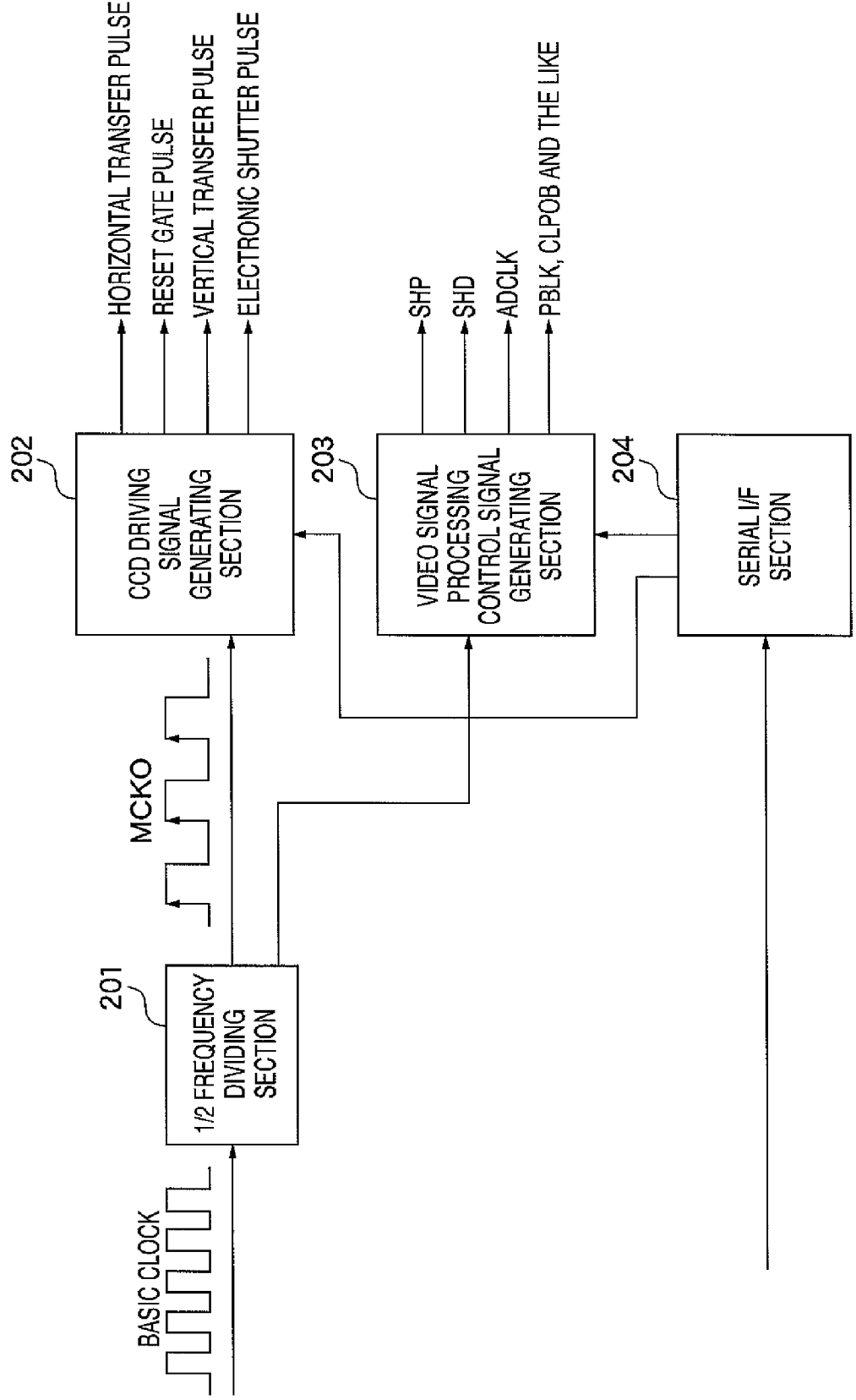

FIG. 4

| OPERATION MODE | HORIZONTAL TRANSFER H1 PULSE WIDTH (sec) | HORIZONTAL TRANSFER H2 PULSE WIDTH (sec) | HORIZONTAL TRANSFER H3 PULSE WIDTH (sec) | RESET GATE PULSE WIDTH (sec) | SHP WIDTH (sec) | SHD WIDTH (sec) | ADCLK WIDTH (sec) |
|---|---|---|---|---|---|---|---|
| STILL IMAGE SHOOTING | $H1d_1$ | $H2d_1$ | $H3d_1$ | $Rd_1$ | $Dd_1$ | $Dd_1$ | $Ad_1$ |
| LIVE VIEW MOVING IMAGE RECORDING | $H1d_2$ | $H2d_2$ | $H3d_2$ | $Rd_2$ | $Dd_2$ | $Dd_2$ | $Ad_2$ |

FIG. 5

| OPERATION MODE | HORIZONTAL TRANSFER H1 PULSE PHASE (sec) | HORIZONTAL TRANSFER H2 PULSE PHASE (sec) | HORIZONTAL TRANSFER H3 PULSE PHASE (sec) | RESET GATE PULSE PHASE (sec) | SHP PHASE (sec) | SHD PHASE (sec) | ADCLK PHASE (sec) |
|---|---|---|---|---|---|---|---|
| STILL IMAGE SHOOTING | $H1p_1$ | $H2p_1$ | $H3p_1$ | $Rp_1$ | $Pp_1$ | $Pp_1$ | $Ap_1$ |
| LIVE VIEW MOVING IMAGE RECORDING | $H1p_2$ | $H2p_2$ | $H3p_2$ | $Rp_2$ | $Pp_2$ | $Pp_2$ | $Ap_2$ |

FIG. 8

| ADDITION NUMBER | HORIZONTAL TRANSFER H1 PULSE WIDTH (sec) | HORIZONTAL TRANSFER H2 PULSE WIDTH (sec) | HORIZONTAL TRANSFER H3 PULSE WIDTH (sec) | RESET GATE PULSE WIDTH (sec) | SHP WIDTH (sec) | SHD WIDTH (sec) | ADCLK WIDTH (sec) |
|---|---|---|---|---|---|---|---|
| 1 | $H1d_1$ | $H2d_1$ | $H3d_1$ | $Rd_1$ | $Dd_1$ | $Dd_1$ | $Ad_1$ |
| 2~9 | $H1d_2$ | $H2d_2$ | $H3d_2$ | $Rd_2$ | $Dd_2$ | $Dd_2$ | $Ad_2$ |

FIG. 9

| ADDITION NUMBER | HORIZONTAL TRANSFER H1 PULSE PHASE (sec) | HORIZONTAL TRANSFER H2 PULSE PHASE (sec) | HORIZONTAL TRANSFER H3 PULSE PHASE (sec) | RESET GATE PULSE PHASE (sec) | SHP PHASE (sec) | SHD PHASE (sec) | ADCLK PHASE (sec) |
|---|---|---|---|---|---|---|---|
| 1 | $H1p_1$ | $H2p_1$ | $H3p_1$ | $Rp_1$ | $Pp_1$ | $Pp_1$ | $Ap_1$ |
| 2~9 | $H1p_2$ | $H2p_2$ | $H3p_2$ | $Rp_2$ | $Pp_2$ | $Pp_2$ | $Ap_2$ |

PRIORT ART

IMAGE SENSING APPARATUS INCLUDING CHARGE TRANSFER OPERATION AND CONTROL METHOD THEREFOR

BACKGROUND OF THE INVENTION

1. Field of the Invention

The present invention relates to an image sensing apparatus which performs image sensing with an image sensing element in which charges can be sequentially transferred in a horizontal direction, and a control method therefor.

2. Description of the Related Art

In recent years, an image sensing apparatus such as an electronic camera which records/plays still images or moving images sensed by an image sensing element such as a CCD, with a memory card having a memory element as a recording medium has been actively developed and commercially available. Here, a common configuration and an operation example of an image input section of a conventional digital camera will be described with reference to FIGS. 10 to 13.

FIG. 10 is a block diagram showing the configuration of the image input section of the conventional digital camera. FIG. 11 is a diagram showing a configuration of a horizontal transfer final stage section of a CCD 1001 in FIG. 10. FIG. 12 is a diagram showing a control timing of a sample-hold circuit. FIG. 13 is a block diagram showing a detailed configuration of a CDS circuit 1002 in FIG. 10.

In FIG. 10, the digital camera is provided with the CCD 1001 which is the image sensing element, a correlated double sampling (hereinafter referred to as "CDS") circuit 1002, an amplifier 1003, an analog-digital converter (hereinafter referred to as "ADC") 1004 and a CCD driving section 1005. The CCD 1001 is driven by respective driving pulse signals such as a horizontal transfer pulse, a reset gate pulse, a vertical transfer pulse and an electronic shutter pulse which are outputted from the CCD driving section 1005, and converts an optical image of an object into an electrical signal.

Within the CCD 1001 which performs horizontal charge transfer driving in a three-phase driving manner, charges exposed and accumulated by a light receiving element are sequentially transferred on a pixel by pixel basis in a horizontal direction by the horizontal transfer pulse. As shown in FIG. 11, the charges are eventually transferred from a horizontal transfer pulse H2 section 1100 to a horizontal transfer pulse H3 section 1101, and to a horizontal transfer pulse H1 section 1102. Subsequently, the charges pass through a horizontal final stage 1103, and are transferred to a floating diffusion (FD) section 1104, then converted into a voltage signal, and sequentially outputted as a video signal per pixel. After being converted into the voltage signal, the charges are swept (discarded) into a drain section 1106 by turning ON a reset gate 105.

In this way, the signal outputted from the CCD 1001 requires a reset operation per pixel. This reset operation causes a reset flaw to be generated in the output signal of the CCD 1001.

FIG. 12 shows a relationship between the reset gate pulse (RG) and the reset flaw, and the control timing of the sample-hold circuit for extracting a level of a feed-through section and a level of an optical output signal section, respectively, in one pixel cycle of the output signal of the CCD 1001. The output signal of the CCD 1001 is basically composed of the reset flaw generated from the reset gate pulse, the feed-through level which becomes a black reference per pixel, and the optical output signal level proportional to an amount of light.

Returning to FIG. 10, the CDS circuit 1002 is a noise removal circuit for removing a co-related noise component from the output signal by obtaining a difference between the level of the feed-through section and the level of the optical output signal section in the output signal of the CCD 1001.

As shown in FIG. 13, a common CDS circuit is configured with sample-hold circuits 1301 and 1302 which are connected in series, a sample-hold circuit 1303, and a differential amplifier 1304. An SHP is a pulse signal for sample-holding a feed-through period for retaining a reset level. An SHD is a pulse signal for sample-holding an optical output signal period. The CDS circuit is configured to sample-hold the output signal of the CCD with the SHP and the SHD by the sample-hold circuits 1301, 1302 and 1303, and to take a difference between respective outputs of the sample-hold circuits 1302 and 1303 by the differential amplifier 1304.

Returning to FIG. 10, an output signal of the CDS circuit 1002 is amplified to a specified signal level in accordance with an input range of the ADC 1004 by the amplifier 1003. An output signal of the amplifier 1003 is converted into a digital signal by the ADC 1004, and subsequently further transmitted to a digital signal processing circuit (not shown) at a subsequent stage.

The image sensing apparatus such as the above described digital camera has tended to increase resolutions or an operating speed related to shooting year by year in response to market needs for higher image quality for enhancing the quality of images or increase in the number of pixels for increasing the pixels. Most models of the image sensing apparatus with increased resolutions or operating speed have a high-speed continuous shooting function, a live view function (function of focusing or the like while displaying a sensed image in real time), and further a moving image function. Thus, a high CCD driving frequency is required for satisfying these functions (specifications).

On the other hand, the high CCD driving frequency set in the image sensing apparatus causes a harmful effect in which timing margins of the feed-through period (TP) and the optical output signal period (TD) shown in FIG. 12 are reduced. Thus, stability of the sample-hold of each signal is decreased, and a signal-to-noise ratio (S/N) property may be degraded.

As a countermeasure against the degradation of the S/N property, there is a method of setting phases and pulse widths so as to increase the timing margin of the feed-through period or the optical output signal period. For example, it becomes possible to take a large timing margin of the feed-through period (TP) or the optical output signal period (TD) by setting a small pulse width of the reset gate pulse among the respective CCD driving pulse signals (for example, see Japanese Laid-Open Patent Publication (Kokai) No. 2006-42261).

However, as the above described conventional art, as the countermeasure against the degradation of the S/N property, if the phases and the pulse widths have been set so that the timing margins of the feed-through period and the optical output signal period can be secured, the following problem occurs. In other words, as a harmful effect of the countermeasure against the degradation of the S/N property, a defective reset may be generated in the case of handling a large charge at a horizontal final stage section of the CCD. A reason thereof will be described by using FIGS. 12, 3 and 6.

FIGS. 6A to 6C show charge transfer states at the horizontal transfer final stage section of the three-phase driving in the CCD. FIG. 3A is a diagram showing a phase relationship between a horizontal transfer pulse H3 and the reset gate pulse which are CCD driving pulse signals in a still image recording operation mode of the digital camera, and FIG. 3B is a diagram showing a waveform of the CCD output signal.

FIG. 3C is a diagram showing a phase relationship among a horizontal transfer pulse H1, the horizontal transfer pulse H3 and a horizontal transfer pulse H2 which are the CCD driving pulse signals. In other words, FIG. 3A shows the phase relationship between a horizontal transfer pulse HS 303 and a reset gate pulse (RG) 301, and FIG. 3C shows the phase relationship among a horizontal transfer pulse H1 302, the horizontal transfer pulse H3 303 and a horizontal transfer pulse H2 304.

In order to secure the timing margins of the feed-through period and the optical output signal period, it is necessary to minimize effects of the reset flaw generated from the reset gate pulse. To that end, generally, a reset flaw period is shortened by reducing the pulse width of the reset gate pulse (RG) of FIG. 12. However, in the pulse width of the reset gate pulse, it is necessary to secure a minimum time required for sweeping the charges into the drain section.

If only the reset gate pulse width has been shortened without changing other pulse widths, as shown in FIG. 3A, a timing may be generated in which an OFF timing of the reset gate pulse 301 has phase-advanced with respect to an OFF timing of the horizontal transfer pulse H3 303.

In the case of the above described phase-advanced timing, as shown in FIG. 6B, a period for sweeping the charges by the reset gate pulse is insufficient. Thus, if a charge handled at a horizontal transfer pulse H1 section 602 is large, the defective reset is generated in which charges that cannot be discarded into a drain section 606 are left in an FD section 604. The charges left in the FD section 604 is generated as aliasing in the feed-through period, and if the CDS with the optical output signal period has been performed, image darkening in which an image is darkened more than its original brightness is generated.

SUMMARY OF THE INVENTION

The present invention provides an image sensing apparatus which is capable of reducing degradation of a signal-to-noise ratio property occurring when a driving frequency of an image sensing element is high, depending on a state of an operation mode or a pixel addition number, and a control method therefor. Furthermore, the present invention provides an image sensing apparatus which can reduce remaining charges in a floating diffusion section, which become problematic when a large charge is handled at a horizontal final stage section in the image sensing element, depending on the state of the operation mode or the pixel addition number, and a control method therefor.

In a first aspect of the present invention, there is provided an image sensing apparatus comprising an image sensing element in which charges can be sequentially transferred in a horizontal direction, a driving unit adapted to drive said image sensing element, a signal processing unit adapted to perform signal processing on an output signal of said image sensing element, a generating unit adapted to generate timing signals supplied to said driving unit and said signal processing unit, a storage unit adapted to store an information table including at least one of information on a timing of a horizontal transfer driving signal for performing charge transfer in the horizontal direction in said image sensing element, information on a timing of a reset gate signal for performing charge sweep per pixel, and information on a timing of a feed-through sample-hold signal for sample-holding a feed-through section of the output signal of said image sensing element which becomes a black reference per pixel, in association with an operation mode of the image sensing apparatus, a setting unit adapted to set the operation mode of the image sensing apparatus, and a control unit adapted to select the information table associated with the operation mode set by said setting unit from said storage unit, and drive said image sensing element based on the information table by said driving unit.

In a second aspect of the present invention, there is provided an image sensing apparatus comprising an image sensing element in which charges can be sequentially transferred in a horizontal direction and pixels can be added, a driving unit adapted to drive said image sensing element, a signal processing unit adapted to perform signal processing on an output signal of said image sensing element, a generating unit adapted to generate timing signals supplied to said driving unit and said signal processing unit, a storage unit adapted to store an information table including at least one of information on a timing of a horizontal transfer driving signal for performing charge transfer in the horizontal direction in said image sensing element, information on a timing of a reset gate signal for performing charge sweep per pixel, and information on a timing of a feed-through sample-hold signal for sample-holding a feed-through section of the output signal of said image sensing element which becomes a black reference per pixel, in association with a pixel addition number in said image sensing element, a detecting unit adapted to detect the pixel addition number in said image sensing element, and a control unit adapted to select the information table associated with the pixel addition number detected by said detecting unit from said storage unit, and drive said image sensing element based on the information table by said driving unit.

In a third aspect of the present invention, there is provided a control method of an image sensing apparatus comprising an image sensing element in which charges can be sequentially transferred in a horizontal direction, a driving unit that drives the image sensing element, a signal processing unit that performs signal processing on an output signal of the image sensing element, and a generating unit that generates timing signals supplied to the driving unit and the signal processing unit, the control method comprising, a setting step of setting an operation mode of the image sensing apparatus, and a control step of selecting an information table associated with the operation mode set in said setting step, from a storage unit that store an information table including at least one of information on a timing of a horizontal transfer driving signal for performing charge transfer in the horizontal direction in the image sensing element, information on a timing of a reset gate signal for performing charge sweep per pixel, and information on a timing of a feed-through sample-hold signal for sample-holding a feed-through section of the output signal of the image sensing element which becomes a black reference per pixel, in association with the operation mode of the image sensing apparatus, and driving the image sensing element based on the information table by the driving unit.

In a fourth aspect of the present invention, there is provided a control method of an image sensing apparatus comprising an image sensing element in which charges can be sequentially transferred in a horizontal direction and pixels can be added, a driving unit that drives the image sensing element, a signal processing unit that performs signal processing on an output signal of the image sensing element, and a generating unit that generates timing signals supplied to the driving unit and the signal processing unit, the control method comprising a detecting step of detecting a pixel addition number in the image sensing element, and a control step of selecting an information table associated with the pixel addition number detected by said detecting step, from a storage unit adapted to store an information table including at least one of information on a timing of a horizontal transfer driving signal for performing charge transfer in the horizontal direction in the image sensing element, information on a timing of a reset gate signal for performing charge sweep per pixel, and information on a timing of a feed-through sample-hold signal for sample-holding a feed-through section of the output signal of the image sensing element which becomes a black reference per pixel, in association with the pixel addition number in the image sensing element, and driving the image sensing element based on the information table by the driving unit.

In a fifth aspect of the present invention, there is provided an image sensing apparatus comprising an image sensing element in which charges can be sequentially transferred in a horizontal direction, a driving unit adapted to drive said image sensing element, and a setting unit adapted to set an operation mode of the image sensing apparatus, and driving unit changes a pulse period of a reset gate signal for performing charge sweep per pixel in said image sensing element, depending on the operation mode set by said setting unit.

According to the present invention, the image sensing element is driven based on an information table including at least one of information on a timing of a horizontal transfer driving signal, information on a timing of a reset gate signal, and information on a timing of a feed-through sample-hold signal. Then, the information table is stored in association with the operation mode or the pixel addition number. The information table associated with the operation mode is selected from the storage unit, and the image sensing element is driven by the driving unit based on the information table. As a result, the degradation of the signal-to-noise ratio property occurring when the driving frequency of the image sensing element is high can be reduced depending on the state of the operation mode or the pixel addition number. Moreover, it is possible to reduce the remaining charges in the floating diffusion section, which become problematic when the large charge is handled at the horizontal final stage section in the image sensing element, depending on the state of the operation mode or the pixel addition number.

Further features and advantages of the present invention will become apparent from the following detailed description of exemplary embodiments with reference to the attached drawings.

BRIEF DESCRIPTION OF THE DRAWINGS

FIG. 1 is a block diagram schematically showing a configuration of a digital camera as an image sensing apparatus according to a first embodiment of the present invention.

FIG. 2 is a block diagram showing a detailed configuration of a timing signal generating section of the digital camera.

FIG. 4 is a diagram showing an example of a timing signal pulse width information table corresponding to an operation mode of the digital camera.

FIG. 5 is a diagram showing an example of a timing signal phase information table corresponding to the operation mode of the digital camera.

FIG. 8 is a diagram showing an example of a timing signal pulse width information table depending on corresponding to a pixel addition number.

FIG. 9 is a diagram showing an example of a timing signal phase information table corresponding to the pixel addition number.

DETAILED DESCRIPTION OF THE PREFERRED EMBODIMENTS

Figure 3A:
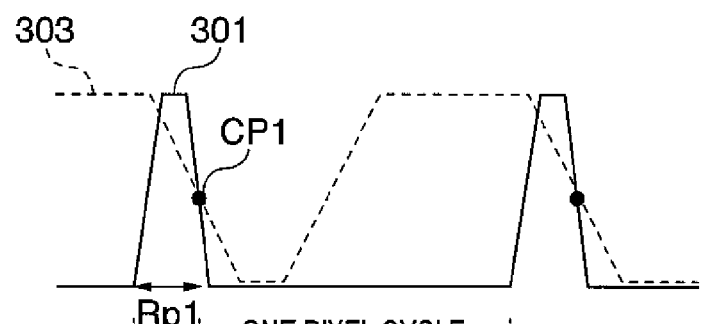
FIG. 3A is a diagram showing a phase relationship between a horizontal transfer pulse H3 and a reset gate pulse which are CCD driving pulse signals in a still image recording operation mode of the digital camera.

Embodiments of the present invention will now be described in detail with reference to the drawings showing preferred embodiments thereof.

FIG. 1 is a block diagram showing a configuration of a digital camera as an image sensing apparatus according to a first embodiment of the present invention.

In FIG. 1, the digital camera is comprised of an image sensing optical system 101, an image sensing section 102, an image sensing driving section 103, an analog signal processing section 104, and a system control section 112. Furthermore, the digital camera is comprised of a memory section 113, a timing signal generating section 116, and a timing signal phase/pulse width changing section 117.

The present embodiment will be described with an example in the case of the digital camera having three operation modes (a still image recording operation mode, a moving image recording operation mode, and a live view operation mode). It should be noted that the digital camera may have a configuration including any operation mode among the still image recording operation mode, the moving image recording operation mode, and the live view operation mode, or an arbitrary operation mode. Moreover, the digital camera may have a configuration further having another operation mode other than the above described operation modes.

The image sensing optical system 101 forms an optical image of an object which has entered at the time of shooting on an image sensing element described below. The image sensing section 102 has an image sensing element which converts the optical image of the object into an electrical signal. In the present embodiment, a CCD having a configuration in which charges can be sequentially transferred in a horizontal direction and pixels can be added is used as the image sensing element. The image sensing driving section 103 drives the image sensing section 102. The analog signal processing section 104 performs signal processing for processing an output signal of the image sensing section 102. An analog/digital conversion section (hereinafter referred to as "ADC section") 105 converts an analog image signal which is an output of the analog signal processing section 104, into a digital image signal.

A signal processing section 106 performs image processing such as white balance correction, γ correction or pixel interpolation with respect to the digital image signal. A frame memory section 107 is a memory which temporarily stores the digital image signal, and for example, is configured with a DRAM. A signal compression section 108 compresses the digital image signal stored in the frame memory section 107 by an approach such as JPEG (Joint Photographic Experts Group). A compression operation is started along with a release operation at the time of the shooting.

A recording media section 109 stores the compressed digital image signal, and for example, is configured with a flash memory. An NTSC/PAL encoder section 110 converts the digital image signal stored in the frame memory section 107 into an NTSC signal (NTSC: National Television System Committee) or a PAL signal (PAL: Phase Alternating by Line). An electronic view finder 111 is a display section that displays the image signal converted into the NTSC signal or the PAL signal.

The system control section 112 controls the respective sections of the digital camera. Moreover, the system control section 112 sets the operation mode of the digital camera based on an instruction from an operator, and also retrieves an information table corresponding to the set operation mode from the memory section 113. Then, the system control section 112 drives the CCD based on the above described information table by the image sensing driving section 103. Information tables are roughly classified into a timing signal phase information table (phase information table) and a timing signal pulse width information table (pulse width information table).

In the digital camera, the information table including at least one of information on a timing of a horizontal transfer driving signal for performing the charge transfer in the horizontal direction in the CCD and information on a timing of a reset gate signal for performing charge sweep per pixel is stored in association with the operation mode in the memory section 113. Alternatively, the information table including at least one of the information on the timing of the horizontal transfer driving signal and the information on the timing of the reset gate signal can also be stored in association with a pixel addition number in the CCD, in the memory section 113. In the present embodiment, in the memory section 113, the timing signal phase information table (phase information table) and the timing signal pulse width information table (pulse width information table) are stored in association with the operation mode.

It should be noted that, in the present embodiment, the following control is also possible. The system control section 112 detects the pixel addition number in the CCD and also retrieves the information table corresponding to the detected pixel addition number from the memory section 113. Then, the system control section 112 drives the CCD based on the above described information table by the image sensing driving section 103. The control related to the pixel addition number will be described later.

An operating section 114 is operated when the operator inputs various instructions (start of the shooting, selection of the operation mode and the like) with respect to the digital camera. A basic clock generating section 115 generates a basic clock signal which becomes a reference of a driving frequency of the image sensing driving section 103. The timing signal generating section 116 generates timing signals supplied to the image sensing driving section 103 and the analog signal processing section 104, based on the basic clock signal outputted from the basic clock generating section 115. The timing signal phase/pulse width changing section 117 changes a phase and a pulse width of the timing signal outputted from the timing signal generating section 116.

FIG. 2 is a block diagram showing a detailed configuration of the timing signal generating section 116 of the digital camera.

In FIG. 2, the timing signal generating section 116 is provided with a ½ frequency dividing section 201, a CCD driving signal generating section 202, a video signal processing control signal generating section 203 and a serial interface (hereinafter referred to as "I/F") section 204. The timing signal generating section 116 is controlled by the system control section 112.

The ½ frequency dividing section 201 frequency-divides the basic clock signal inputted from outside into ½. Hereinafter, the signal frequency-divided into ½ by the ½ frequency dividing section 201 is described as "MCKO". The CCD driving signal generating section 202 generates various signals for driving the image sensing section (CCD). The video signal processing control signal generating section 203 generates various signals for analog signal processing or ADC control. The serial I/F section 204 controls an interface for receiving a control signal from the system control section 112.

The CCD driving signal generating section 202 generates a signal pattern determined for each operation mode of the digital camera, with a phase and a pulse width with reference to a rising edge of the MCKO, and supplies the signal pattern to the COD. Here, a horizontal driving pulse and a reset gate pulse are supplied to the CCD as described below. In other words, the horizontal driving pulse and the reset gate pulse are supplied to the CCD after being changed to a specified phase/pulse width condition from the reference of the rising edge of the MCKO by an analog delay element, a digital processing circuit or the like within the timing signal phase/pulse width changing section 117, based on an instruction from the system control section 112.

The video signal processing control signal generating section 203 generates a signal pattern with reference to the MCKO, and supplies the signal pattern to the analog signal processing section 104 or the ADC section 105. Here, an SHP, an SHD and an ADCLK (a clock supplied to the ADC section 105) are supplied to the analog signal processing section 104 or the ADC section 105 as described below. In other words, the SHP, the SHD and the ADCLK are supplied after being changed to the specified phase/pulse width condition from the reference of the rising edge of the MCKO by the analog delay element, the digital processing circuit or the like within the timing signal phase/pulse width changing section 117, based on the instruction from the system control section 112.

Information indicative of the above described phase/pulse width condition is stored in advance as the timing signal phase information table (see FIG. 5) and the timing signal pulse width information table (see FIG. 4) in the memory section 113. The system control section 112 drives the CCD by the image sensing driving section 103 with reference to the timing signal phase information table and the timing signal pulse width information table stored in the memory section 113.

In the present embodiment, an example of driving the CCD by changing the phase of the timing of the horizontal transfer driving signal for performing the charge transfer in the horizontal direction and the pulse width of the reset gate pulse for performing the charge sweep per pixel, which are generated by the CCD driving signal generating section 202, for each operation mode will be described.

Figure 3B:
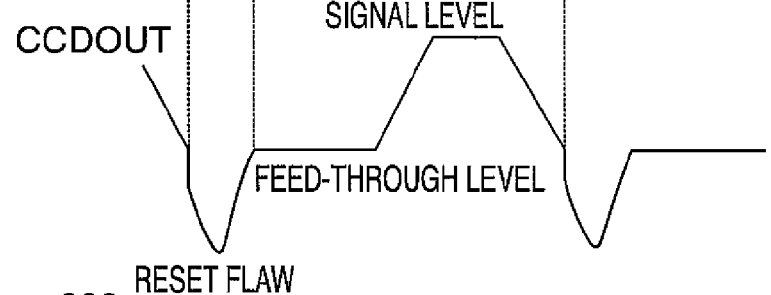
FIG. 3B is a diagram showing a waveform of a CCD output signal.
Figure 3C:
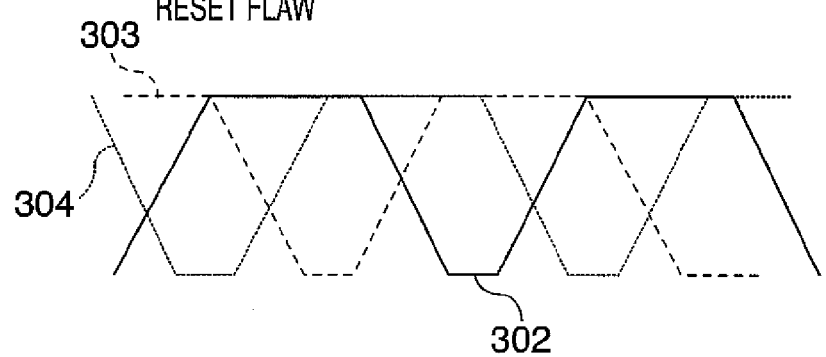
FIG. 3C is a diagram showing a phase relationship among a horizontal transfer pulse H1, the horizontal transfer pulse H3 and a horizontal transfer pulse H2 which are the CCD driving pulse signals.

FIG. 3A is a diagram showing a phase relationship between a horizontal transfer pulse H3 and a reset gate pulse which are CCD driving pulse signals in the still image recording operation mode of the digital camera. FIG. 3B is a diagram showing a waveform of a CCD output signal. FIG. 3C is a diagram showing a phase relationship among a horizontal transfer pulse H1, the horizontal transfer pulse H3 and a horizontal transfer pulse H2 which are the CCD driving pulse signals.

Specifically, FIG. 3A shows a phase relationship between a horizontal transfer pulse H3 303 and a reset gate pulse (RG) 301. FIG. 3C shows a phase relationship among a horizontal transfer pulse H1 302, the horizontal transfer pulse H3 303 and a horizontal transfer pulse H2 304. FIG. 3B shows the waveform of the CCD output signal at that time. It should be noted that, in the present embodiment, the charge transfer in the horizontal direction in the CCD of the digital camera is performed in a three-phase driving manner.

Here, generally, in an electronic camera (particularly the digital camera), an S/N property in a still image recording operation is considered as a very important property in a trend of enhancing image quality in recent years. Therefore, it is necessary to design a CCD driving signal timing in the still image recording operation, in consideration of the S/N property.

As a method of designing the CCD driving signal timing in consideration of the S/N property, there is a method of lengthening stable periods of a feed-through level and an optical output signal level. Particularly, in a feed-through period, it is difficult to maintain the stable period long due to effects of a reset flaw generated from the reset gate pulse 301. Therefore, it is necessary to provide the CCD driving signal timing design in which the effects of the reset flaw are reduced by minimizing an ON period of the reset gate pulse 301 and the feed-through period is lengthened.

FIG. 4 is a diagram showing an example of the timing signal pulse width information table corresponding to the operation mode of the digital camera.

In FIG. 4, the timing signal pulse width information table is a table in which information indicative of respective pulse widths of the horizontal transfer driving signal and the reset gate signal is set, and is stored in the memory section 113 as described above. In other words, in the timing signal pulse width information table, information indicative of the respective pulse widths of the horizontal transfer pulse H1, the horizontal transfer pulse H2, the horizontal transfer pulse H3, the reset gate pulse, the SHP, the SHD and the ADCLK in the respective operation modes is set. An upper row of FIG. 4 shows the case of the still image recording operation mode (still image shooting mode), and a lower row of FIG. 4 shows the case of the live view operation mode and the moving image recording operation mode.

FIG. 5 is a diagram showing an example of the timing signal phase information table corresponding to the operation mode of the digital camera.

In FIG. 5, the timing signal phase information table is a table in which information indicative of respective phases of the horizontal transfer driving signal and the reset gate signal has been set, and is stored in the memory section 113 as described above. In other words, in the timing signal phase information table, information indicative of the respective phases of the horizontal transfer pulse H1, the horizontal transfer pulse H2, the horizontal transfer pulse H3, the reset gate pulse, the SHP, the SHD and the ADCLK in the respective operation modes is set. An upper row of FIG. 5 shows the case of the still image recording operation mode (still image shooting mode), and a lower row of FIG. 5 shows the case of the live view operation mode and the moving image recording operation mode.

In the still image recording operation, as described above, the CCD is driven based on the timing signal pulse width information table in which a reset gate pulse width Rd1 of FIG. 4 is set to a minimum ON period in which a saturation charge per pixel in a still image can be swept, and the timing signal phase information table.

Since the stable period of the feed-through level can be maintained long as described above, it becomes possible to record an image having a stable S/N property in the still image recording operation of the digital camera.

Next, the method of designing the CCD driving signal timing in the live view operation mode and the moving image recording operation mode of the digital camera will be described.

In the live view operation mode and the moving image recording operation mode of the digital camera, a method of adding the pixels in the CCD and reducing the number of output pixels in order to increase a frame rate (a value representing how many times a screen is rewritten in a second when an image is displayed) is general. In this regard, there are problems of blooming (charge overflow) and a defective reset during the charge transfer due to increase in handled charges for the pixel addition in the CCD.

First, a principle of generation of the blooming and the reset error during the horizontal charge transfer will be described by using FIG. 6.

Figure 6A:
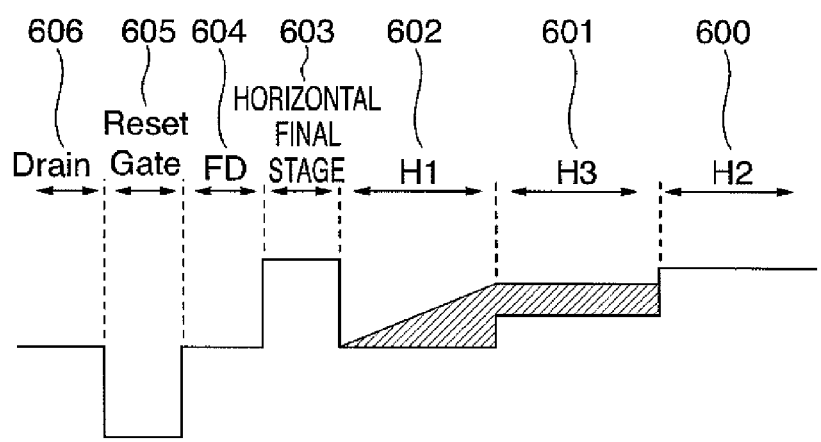
FIGS. 6A to 6C are diagrams showing charge transfer states at a horizontal transfer final stage section of a CCD.
Figure 6B:
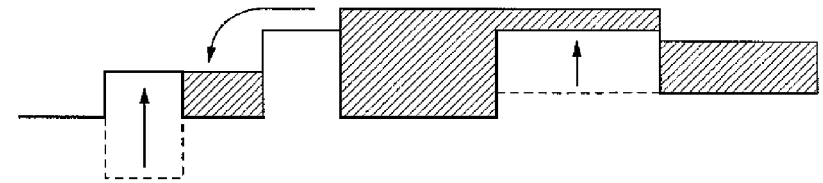
Figure 6C:
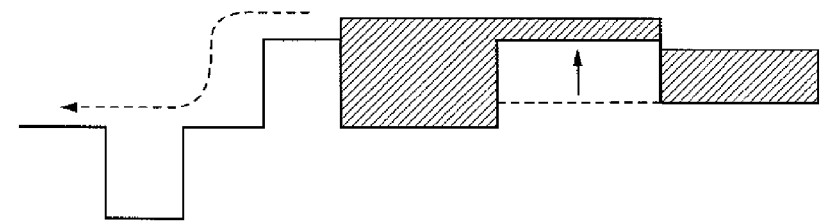

FIGS. 6A to 6C are diagrams showing charge transfer states at a horizontal transfer final stage section of the CCD.

In FIG. 6A, charges exposed and accumulated by a light receiving element of the CCD are sequentially transferred on a pixel by pixel basis in the horizontal direction by the transfer pulse and eventually transferred to a horizontal transfer pulse H3 section 601. Next, the horizontal transfer pulse H3 section 601 is turned OFF, and all charges in the horizontal transfer pulse H3 section 601 are transferred to a horizontal transfer pulse H1 section 602. Here, if an OFF timing of a reset gate 605 is earlier than an OFF timing of the horizontal transfer pulse H3 section 601, the charge sweep into a drain section 606 is not sufficiently performed, which causes a state where the charges remain in a floating diffusion (FD) section 604.

A cross point CP1 of the reset gate pulse 301 and the horizontal transfer pulse H3 303, which are the CCD driving pulse signals shown in the above described FIG. 3A, represents the above described state. The above described state is a state where the reset gate pulse 301 has phase-advanced with respect to the horizontal transfer pulse H3 303, and is equivalent to a method of minimizing the ON period of the reset gate pulse 301, which is the above described method of designing the CCD driving signal timing in the still image recording operation mode.

However, in the still image recording operation mode, since the pixel addition has not been performed, a transferred charge amount is less than that in the live view operation mode and the moving image recording operation mode. Moreover, if a mechanical shutter is used and the charge sweep before reading is performed, since surplus charges of smear and the blooming are not generated, the charges are significantly less likely to remain in the FD section 604 in the still image recording operation mode.

As described above, in the live view operation mode and the moving image recording operation mode, if the same timing signal phase information table and the same timing signal pulse width information table as those in the still image recording operation mode are used to drive the CCD, remaining charges may be generated due to the reset error. Therefore, in the live view operation mode and the moving image recording operation mode, it is necessary to perform the CCD driving signal timing design in which the remaining charges in the FD section 604 are reduced.

Figure 7A:
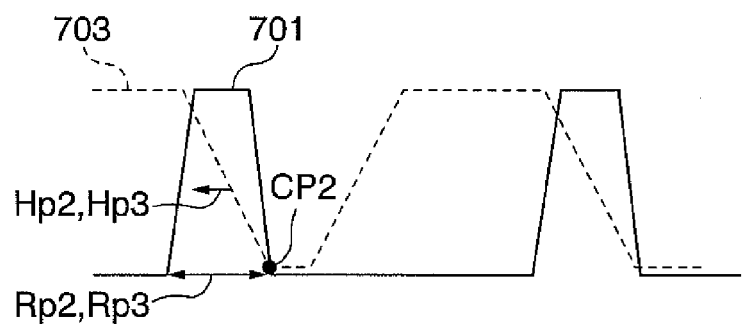
FIG. 7A is a diagram showing a phase relationship between a horizontal transfer pulse H3 and a reset gate pulse which are CCD driving pulse signals in a live view operation mode and a moving image recording operation mode of the digital camera.
Figure 7B:
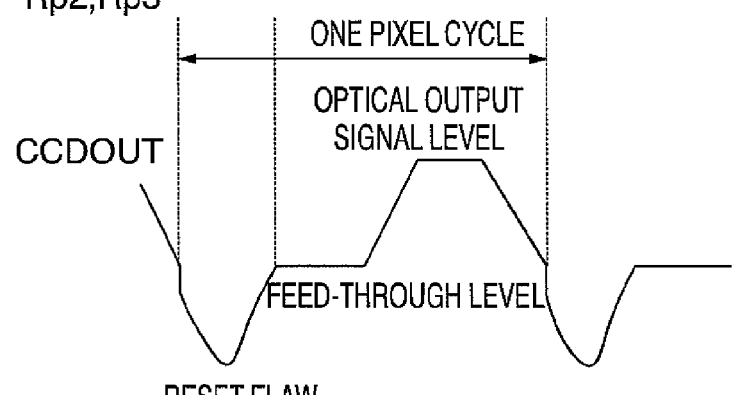
FIG. 7B is a diagram showing a waveform of a CCD output signal.
Figure 7C:
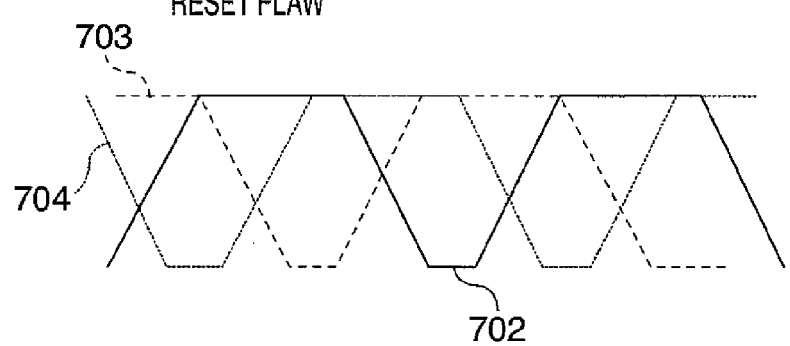
FIG. 7C is a diagram showing a phase relationship among a horizontal transfer pulse H1, the horizontal transfer pulse H3 and a horizontal transfer pulse H2 which are the CCD driving pulse signals.
Figure 10:
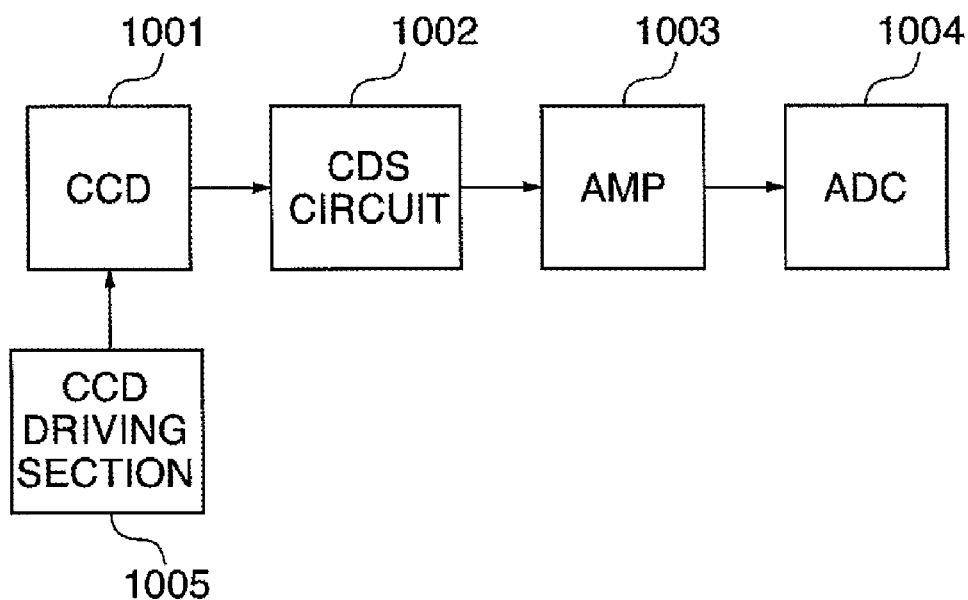
FIG. 10 is a block diagram showing a configuration of an image input section of a conventional digital camera.
Figure 11:
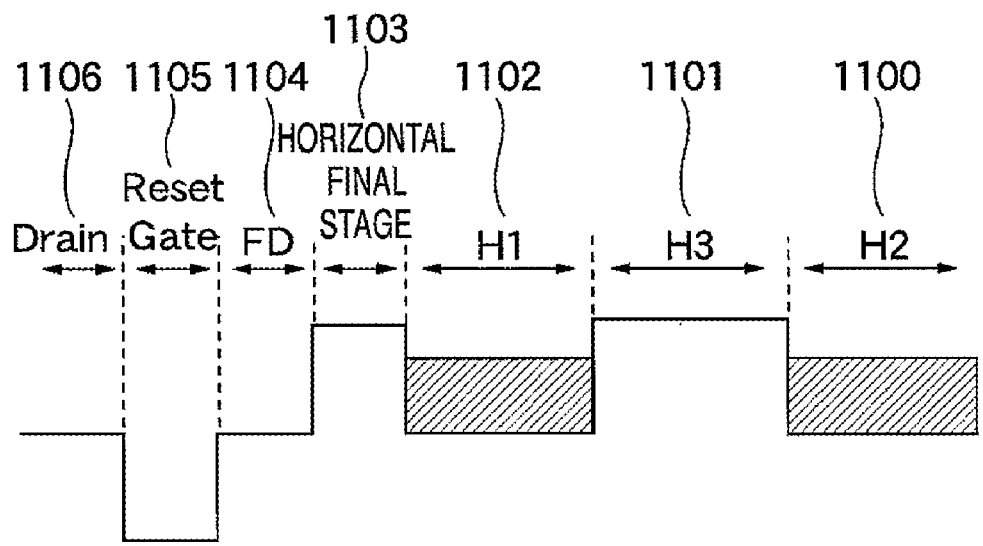
FIG. 11 is a diagram showing a configuration of a horizontal transfer final stage section of a CCD of the digital camera in FIG. 10.
Figure 12:
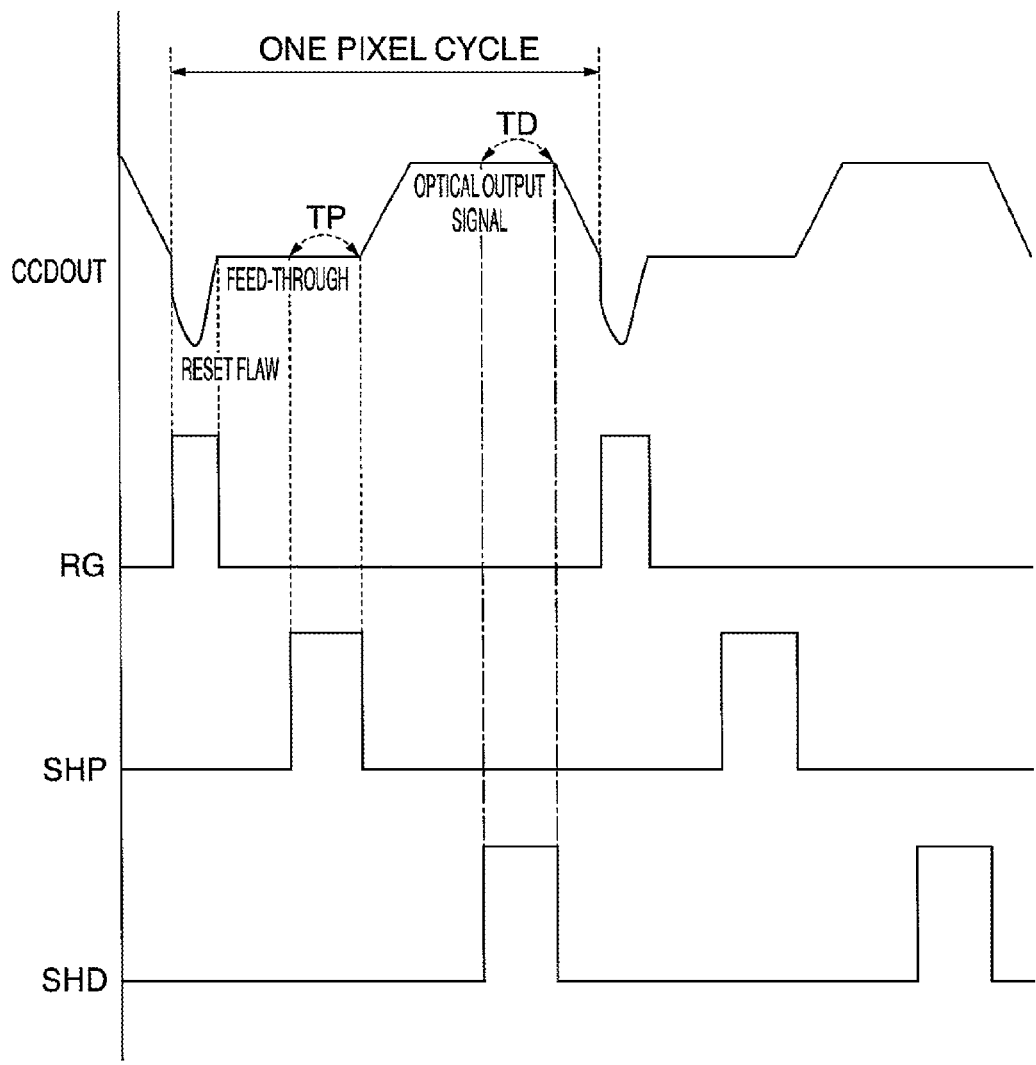
FIG. 12 is a diagram showing a control timing of a sample-hold circuit of the digital camera.
Figure 13:
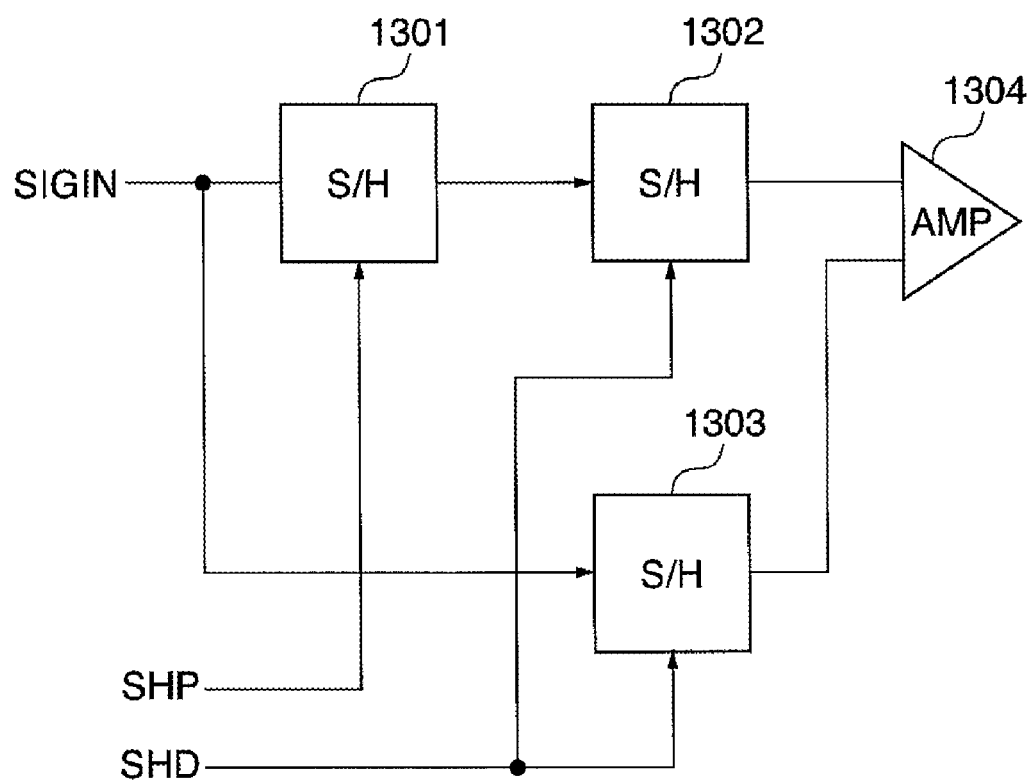
FIG. 13 is a block diagram showing a detailed configuration of a CDS circuit of the digital camera in FIG. 10.

FIG. 7A is a diagram showing a phase relationship between a horizontal transfer pulse H3 and a reset gate pulse which are CCD driving pulse signals in the live view operation mode and the moving image recording operation mode of the digital camera. FIG. 7B is a diagram showing a waveform of a CCD output signal. FIG. 7C is a diagram showing a phase relationship among a horizontal transfer pulse H1, the horizontal transfer pulse H3 and a horizontal transfer pulse H2 which are the CCD driving pulse signals.

Specifically, FIG. 7A shows a phase relationship between a horizontal transfer pulse H3 703 and a reset gate pulse (RG) 701. FIG. 7C shows a phase relationship among a horizontal transfer pulse H1 702, the horizontal transfer pulse H3 703 and a horizontal transfer pulse H2 704. FIG. 7B shows the waveform of the CCD output signal at that time.

In order to reduce the above described remaining charges in the FD section 604, it is necessary to further approximate an OFF timing of the reset gate pulse 701 to an OFF timing of the horizontal transfer pulse H3 703 as described above. In the present embodiment, as shown in FIG. 7A, a pulse width of the reset gate pulse 701 is widened, a phase of the horizontal transfer pulse H3 703 is advanced, and the respective OFF timings of the reset gate pulse 701 and the horizontal transfer pulse H3 703 are set to the same timing.

In the case of advancing the phase of the horizontal transfer pulse H3 703, it is also necessary to pay attention to cross points with other horizontal transfer driving signals. If the cross point is not within a specified range, horizontal transfer degradation may be caused. Moreover, in the case of widening the pulse width of the reset gate pulse 701, the S/N property may be lowered.

However, since the pixel addition is generally performed in the live view operation mode and the moving image recording operation mode of the digital camera, charge capacity more than that in the still image recording operation mode can be secured. Therefore, in the live view operation mode and the moving image recording operation mode, an ISO sensitivity lower than that in the still image recording operation mode can be set, and the S/N property equivalent to that in the still image recording operation mode is less likely to be required.

Thus, in the present embodiment, in the live view operation mode or the moving image recording operation mode, the timing signal phase information table of FIG. 5 is changed to a table in which the pulse width of the reset gate pulse 701 is widened to Rp2 or Rp3 in a range in which the S/N property is not significantly affected. Moreover, the timing signal pulse width information table of FIG. 4 is changed to a table in which the phase of the horizontal transfer pulse H3 is phase-advanced to H3d2 or H3d3 in consideration of the cross points with other horizontal transfer driving signals. It should be noted that, the value Rp3 may be identical with the value Rp2 and that the value H3d3 may be identical with the value H3d2.

Eventually, from the timing signal pulse width information table of FIG. 4 and the timing signal phase information table of FIG. 5, the pulse width of the reset gate pulse and the phase of the horizontal transfer pulse H3 are switched depending on the operation mode, and the CCD is driven with reference to the information table. It should be noted that, instead of switching the pulse width of the reset gate pulse and the phase of the horizontal transfer pulse H3 depending on the operation mode, there is also a method of switching the pulse width of the reset gate pulse and the phase of the horizontal transfer pulse H3 depending on the pixel addition number in the CCD.

Since the remaining charges generated in the FD section 604 in the live view operation mode and the moving image recording operation mode depend on a charge amount, the remaining charges are likely to be generated if the pixel addition number in the CCD is large. If the pixel addition number in the CCD is small (for example, the pixel addition number is set to 1), a timing signal pulse width information table (FIG. 8) and a timing signal phase information table (FIG. 9) for enabling the CCD driving signal timing in which degradation of the S/N property shown in FIGS. 3A and 3B has been reduced are created.

Moreover, if the pixel addition number is large (for example, the pixel addition number is set to any one of 2 to 9), the timing signal pulse width information table (FIG. 8) and the timing signal phase information table (FIG. 9) for enabling the CCD driving signal timing in which the remaining charges in the FD section 604 of FIG. 6B have been reduced are created. Then, the CCD is driven with reference to the created timing signal pulse width information table and the created timing signal phase information table.

As described above, according to the present embodiment, the CCD is driven by the image sensing driving section 103, based on the timing signal phase information table and the timing signal pulse width information table corresponding to a state of the operation mode or the pixel addition number. As a result, the degradation of the S/N property, occurring when a driving frequency of the CCD is high, can be reduced depending on the state of the operation mode or the pixel addition number. Moreover, it is possible to reduce the remaining charges in the floating diffusion section, which become problematic when a large charge is handled at a horizontal final stage section in the CCD, depending on the state of the operation mode or the pixel addition number.

The second embodiment differs from the first embodiment only in the following points. The other elements of the second embodiment are the same as corresponding ones of the first embodiment described above (FIGS. 1 and 2), and description thereof is therefore omitted.

In the present embodiment, an example of driving the CCD by changing the phase as described below, will be described. In other words, the phase of the timing of the horizontal transfer driving signal for performing the charge transfer in the horizontal direction, which is generated by the CCD driving signal generating section 202, and a phase of a timing of the SHP for sample-holding a feed-through section of the CCD output signal which becomes a black reference per pixel are changed for each operation mode. Thereby, the CCD is driven. It should be noted that the SHP is a feed-through sample-hold signal.

The memory section 113 stores an information table including the information on the timing of the horizontal transfer driving signal for performing the charge transfer in the horizontal direction in the CCD and information on the timing of the SHP for sample-holding the feed-through section of the CCD output signal which becomes the black reference per pixel. In other words, as the information table, the memory section 113 stores the above described information (the phase of the timing of the horizontal transfer driving signal and the phase of the timing of the SHP) in association with the operation mode.

Generally, in the electronic camera (particularly the digital camera), the S/N property in the still image recording operation is considered as the very important property in the trend of enhancing the image quality in recent years. Therefore, it is necessary to design the CCD driving signal timing in the still image recording operation, in consideration of the S/N property.

However, in the live view operation mode and the moving image recording operation mode, if the same timing signal phase information table and the same timing signal pulse width information table as those in the still image recording operation mode are used to drive the CCD, the remaining charges may be generated due to the reset error. Therefore, in the live view operation mode and the moving image recording operation mode, it is necessary to perform the sample-hold of the feed-through section at a timing before the remaining charges increase in the FD section 604.

Figure 14:
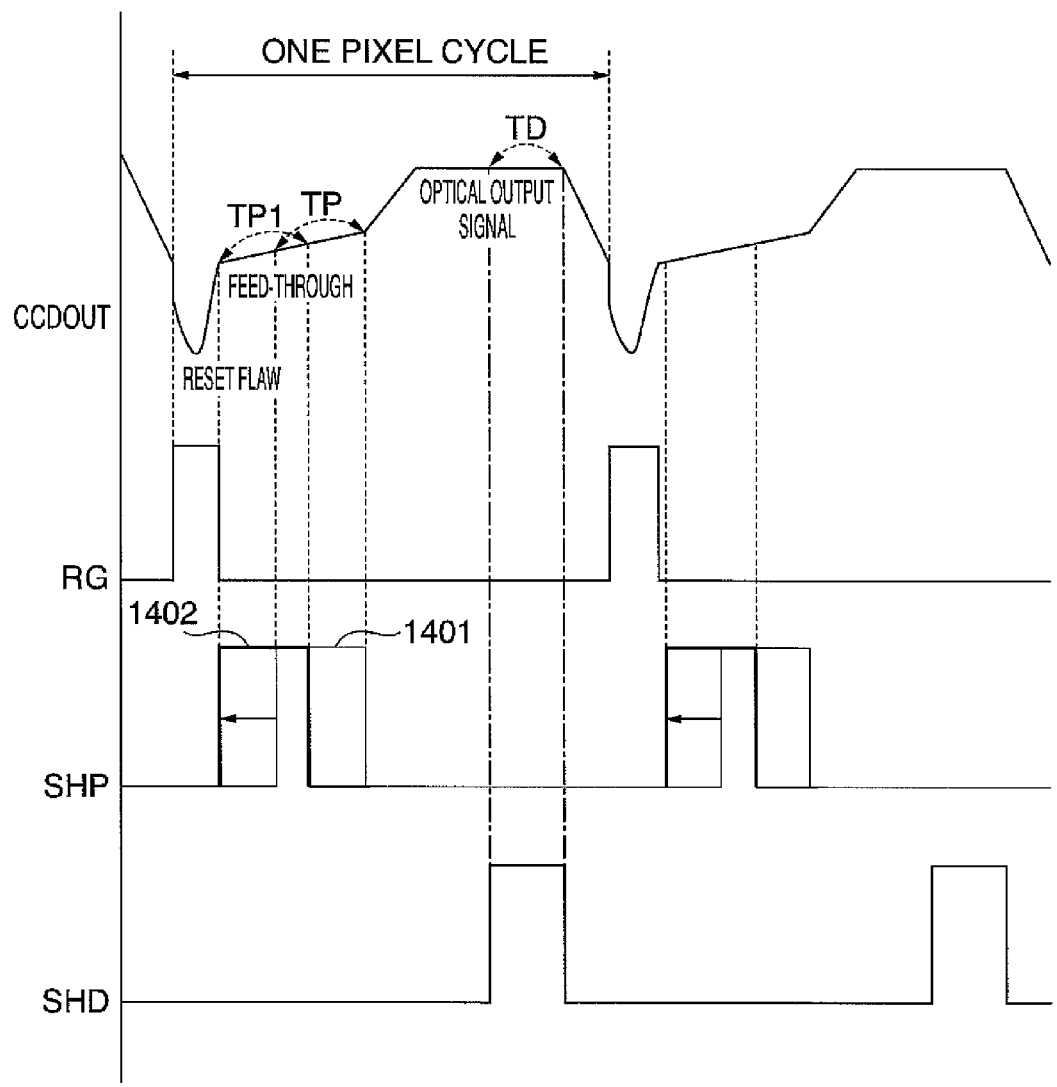
FIG. 14 is a diagram showing the control timing of the sample-hold circuit of the digital camera as the image sensing apparatus according to a second embodiment of the present invention.

FIG. 14 is a diagram showing a control timing of a sample-hold circuit of the digital camera as the image sensing apparatus according to the present embodiment.

FIG. 14 shows the control timing of the sample-hold circuit (not shown) in the case where the remaining charges have been generated in the ED section 604. In other words, FIG. 14 shows the control timing of the sample-hold circuit for extracting a reset gate pulse (RG), a level of the feed-through section, and a level of an optical output signal section, in one pixel cycle of an output signal of a CCD 1001, respectively.

As described above, in the still image recording operation, since the S/N property is prioritized, the phase of the SHP is set to a phase timing 1401 in a posterior part of the feed-through section, which is generally less subject to an effect of a reset noise. However, the phase timing 1401 sample-holds a period TP of FIG. 14 in the live view operation mode and the moving image recording operation mode, and becomes a timing for contributing to aliasing (the remaining charges in the ED section 604) generated in the feed-through section which is the black reference.

Thus, in the present embodiment, in the live view operation mode and the moving image recording operation mode, the phase of the SHP is set to a phase timing 1402 in an anterior part of the feed-through section, which is a timing for reducing the aliasing generated in the feed-through section which is the black reference, by sample-holding a period TP1 of FIG. 14.

As described above, according to the present embodiment, similarly to the above described first embodiment, the degradation of the S/N property can be reduced and also the remaining charges in the floating diffusion section can be reduced.

The above described respective embodiments have shown only an specific example for implementing the present invention, and the technical scope of the present invention must not be construed to be limited thereby. In other words, the present invention can be implemented in various forms without departing from the technical idea or the main characteristics thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application Nos. 2007-114370, filed Apr. 24, 2007, and 2007-201955, filed Aug. 2, 2007, which is hereby incorporated by reference herein in its entirety.

What is claimed is:

1. An image sensing apparatus comprising:
an image sensing element in which charges can be sequentially transferred in a horizontal direction and pixels can be added;
a driving unit adapted to drive said image sensing element;
a signal processing unit adapted to perform signal processing on an output signal of said image sensing element;
a generating unit adapted to generate timing signals supplied to said driving unit and said signal processing unit;
a storage unit adapted to store an information table including at least one of information on a timing of a horizontal transfer driving signal for performing charge transfer in the horizontal direction in said image sensing element, information on a timing of a reset gate signal for performing charge sweep per pixel, and information on a timing of a feed-through sample-hold signal for sample-holding a feed-through section of the output signal of said image sensing element which becomes a black reference per pixel, in association with a pixel addition number in said image sensing element;
a detecting unit adapted to detect the pixel addition number in said image sensing element; and
a control unit adapted to select the information table associated with the pixel addition number detected by said detecting unit from said storage unit, and drive said image sensing element based on the information table by said driving unit.

2. A control method of an image sensing apparatus comprising an image sensing element in which charges can be sequentially transferred in a horizontal direction and pixels can be added, a driving unit that drives the image sensing element, a signal processing unit that performs signal processing on an output signal of the image sensing element, and a generating unit that generates timing signals supplied to the driving unit and the signal processing unit, the control method comprising:
a detecting step of detecting a pixel addition number in the image sensing element; and
a control step of selecting an information table associated with the pixel addition number detected by said detecting step, from a storage unit adapted to store an information table including at least one of information on a timing of a horizontal transfer driving signal for performing charge transfer in the horizontal direction in the image sensing element, information on a timing of a reset gate signal for performing charge sweep per pixel, and information on a timing of a feed-through sample-hold signal for sample-holding a feed-through section of the output signal of the image sensing element which becomes a black reference per pixel, in association with the pixel addition number in the image sensing element, and driving the image sensing element based on the information table by the driving unit.

\* \* \* \* \*